Nov. 12, 1968  T. HAYES  3,410,506
EXTENSIBLE ROTOR AIRPLANE
Filed Feb. 6, 1967  2 Sheets-Sheet 1

INVENTOR.
THOMAS HAYES
BY
Kenneth S. Goseph
ATTORNEYS

FIG. 5
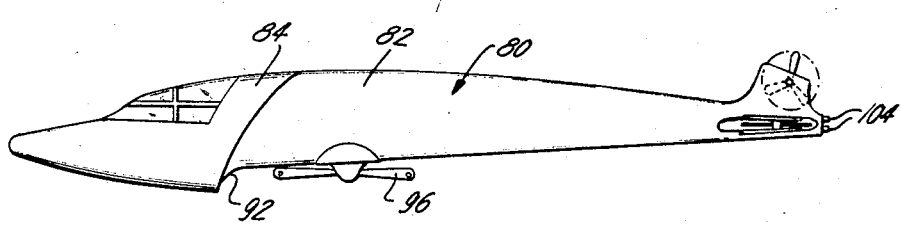
FIG. 6
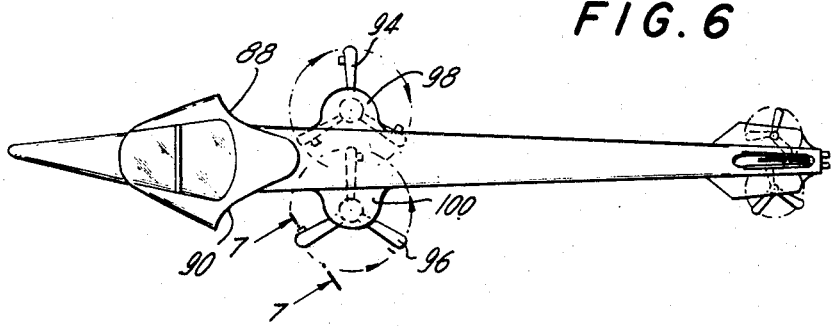
FIG. 7
INVENTOR.
THOMAS HAYES
BY
Kenneth S. Goodford
ATTORNEYS United States Patent Office 3,410,506
Patented Nov. 12, 1968

3,410,506
EXTENSIBLE ROTOR AIRPLANE
Thomas Hayes, 166 W. 27th St.,
New York, N.Y. 10001
Filed Feb. 6, 1967, Ser. No. 614,232
9 Claims. (Cl. 244—7)

ABSTRACT OF THE DISCLOSURE

An airplane including a fuselage body having a longitudinal axis and having a slot opening into the sides thereof forming a rotor receiving chamber. The airplane includes a pair of wings pivotally mounted in the chamber and movable from a folded position with said wings to an extended position with the wings extending divergently outwardly and rearwardly. Means are provided for pivoting said wings and rotors on said wings are synchronized with drive means for driving the rotors. The rotors partially are received in the chamber when the wings are in a folded position and are disposed at an attitude to provide lift at high speeds for the airplane in the folded position.

---

This invention relates to aircraft, and more particularly to a high speed jet propelled extensible rotor airplane.

Various types of rotor equipped aircraft have been developed for facilitating take-off of jet propelled airplanes. However, these rotor equipped aircraft have heretofore had too much drag to permit for utilizing jet propulsion to best advantage at high speed. The present invention contemplates utilizing rotors for facilitating take-off, but the rotors are extensible and retractable, being mounted on movable wings pivoted to the fuselage so that the amount of lift can be increased at lower speeds by extending the wings and rotors, the frontal area or drag being decreased to a minimum at high speeds.

An object of the invention is to provide an efficient arrangement in a jet propelled aircraft for affording increased lift at low speeds, during hovering, and take-off while assuring a minimum amount of drag at high speeds.

A further object of the invention resides in a relative arrangement of wings and rotors for an extensible rotor high speed aircraft wherein the rotors are mounted between wing sections which in turn are pivotally mounted in the fuselage of the aircraft so that the wings are movable from an extended position with the wings extending divergently rearwardly to a position wherein the wings are entirely received within a chamber in the fuselage with the rotors partially extending outwardly and being inclined at an attitude to provide for the desired amount of lift at relatively high speeds.

A further important object of the invention resides in an arrangement of parts in an aircraft wherein a chamber in the fuselage in which the wings are mounted communicates with the jet propulsion means in the tail assembly for providing at least some of the intake air for jet propulsion means.

These, together with the various ancillary objects and features of the invention, which will become apparent as the following description proceeds are attained by this airplane, preferred embodiments of which are illustrated in the accompanying drawings, by way of example only, wherein:

FIG. 5 is a side elevational view of a modified form of the invention;

FIG. 6 is a top plan view of the modified embodiment; and,

FIG. 7 is an enlarged sectional view taken along the plane of line 7—7 in FIG. 6.

Figure 1:
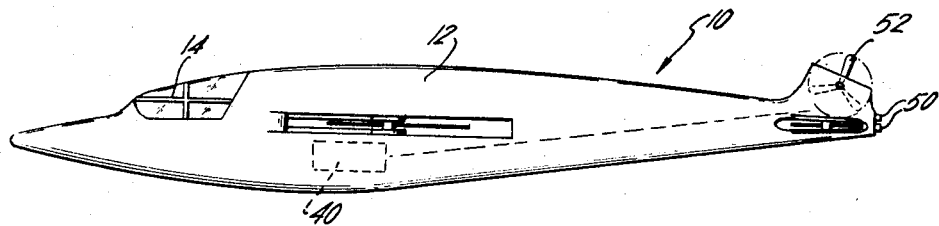
FIG. 1 is a side elevational view of an embodiment of the invention.
Figure 2:
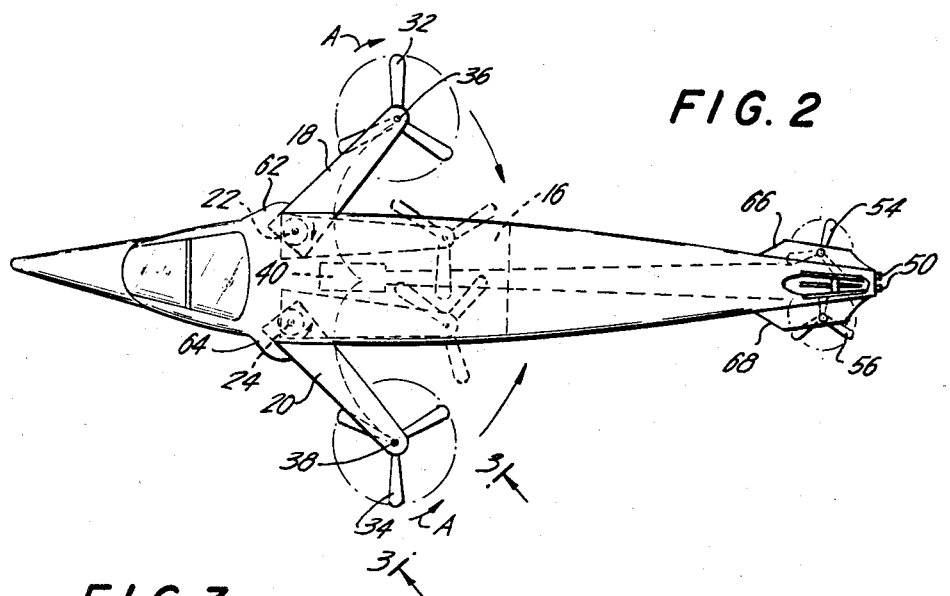
FIG. 2 is a top plan view of the airplane shown with the wings and rotors in an extended position in solid lines and in their folded position in dotted lines.
Figure 3:
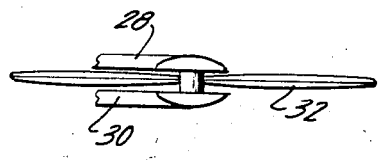
FIG. 3 is an enlarged partial elevational view looking along the plane of line 3—3 in FIG. 2.
Figure 4:
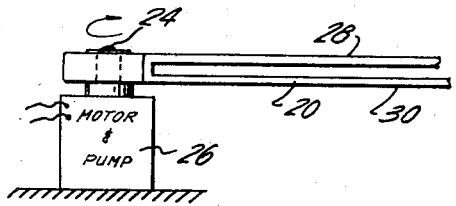
FIG. 4 is a schematic view of the positioning means for the wings and rotors.

With continuing reference to the accompanying drawings, wherein like reference numerals designate similar parts throughout the various views, reference numeral 10 generally designates an airplane constructed in accordance with the concepts of the present invention. The airplane includes a fuselage 12 which is suitably streamlined and has a suitable cabin or cabins 14 for pilot, crew and passengers. The fuselage is provided with a transverse slot 16 therein in which a pair of wings 18 and 20 are pivotally mounted on shafts 22 and 24. A motor or motors as shown in FIG. 4 and indicated at 26 drives each shaft 22 and 24 in a manner so as to rotate the wings 18 and 20 from an extended position as shown in the solid lines in FIG. 2 to a position as shown in the dotted lines in FIG. 2.

Each of the wings 18 and 20 are formed in upper and lower lift sections 28 and 30 between which a pair of rotors 32 and 34 are mounted on shafts 36 and 38. These rotors may be driven either by a suitable cable or other drive mechanisms or may be jet powered as in the manner as will be hereinafter disclosed. The drive mechanism for the rotors may be a motor 40 disposed within the fuselage and connected in any suitable way to the shafts 36 and 38. The drive means for the rotors 32 and 34 are suitably synchronized so that the rotors which turn in the direction indicated by arrows A in FIG. 2 may substantially free wheel when the aircraft is under jet propulsion and when the rotors are turned off so as to reduce drag and are so arranged so as to be at an attitude to provide lift when at their recess position as shown in dotted lines in FIG. 2.

A jet engine having jet exhausts 50 is provided in the fuselage and the propulsion drive emits from the rear of the aircraft. The jet engine may be partially connected by air intake vents to the slotted portion 16 so that at least part of the intake air for the jet engine is that which passes into the chamber or slot 16.

The tail assembly may include a vertical rotor 52 to serve as a rotor mechanism which may be controlled or positioned at any selected attitude as well as a pair of rotors 54 and 56 serving as horizontal stabilizers and lift providers for the tail assembly. These rotors 52, 54 and 56 may be driven by the motor 40 or in any other suitable manner.

Wing stubs 62 and 64 and elevator stubs 66 and 68 are provided to reduce drag and to conform the streamlined effect of the airplane.

Referring to the embodiment as shown in FIG. 5, reference numeral 80 generally designates this embodiment of aircraft which includes a fuselage 82. The cabin portion 84 is of a suitable streamlined shape and is undercut or recessed at the sides at 88 and 90 as well as at the lower portion 92 to reduce air resistance at the rotors 94 and 96 mounted on assemblies 98 and 100 suitably driven either by motor drive or jet means as shown.

The tail assembly of the embodiment shown in FIGS. 5 through 7 is similar to the embodiment shown in FIGS. 1 through 4. A jet propulsion plant, not shown, is exhausted through exhaust pipes 104 in the tail assembly. The rotors 94 and 96 may be rotated, due to the jet streams from jets 108 set into the rotor, in the direction of arrow 106. The jets 108 are formed in the blades of the rotors 94 and 96. This can be seen best in FIG. 7.

In use, in either embodiment of the invention, the aircraft is designed for vertical takeoff using the sets of rotors 32 and 34 or 94 and 96 and with operation of the respective tail assembly to provide lift at the rear of the aircraft. Then, after the aircraft has achieved its vertical takeoff, its main jet propulsion plant will cause forward propulsion, and when suitable speed is obtained, the wings 18 and 20 can be retracted. The rotor in its stopped position as shown in the embodiment of FIGS. 5 through 7 will provide for lift at high speed.

In the embodiment shown in FIGS. 1 through 4, the rotors will provide for suitable lift at the highest speed even when in their folded position with a minimum drag. At an intermediate speed, the wings 18 and 20 can be partially extended to provide for a desired amount of repeat at an optimum reduction in drag.

A latitude of modification, substitution and change is intended in the foregoing disclosure, and in some instances, some features of the invention will be employed without a corresponding use of other features. Accordingly, it is appropriate that the appended claims be construed broadly and in a manner consistent with the spirit and scope of the invention herein.

I claim:

1. An airplane comprising a fuselage body having a longitudinal axis and having a slot opening into the sides thereof forming a rotor receiving chamber, a pair of wings pivotally mounted in said chamber and movable from a folded position with said wings being received in said chamber and substantially parallel to said longitudinal axis to an extended position with said wings extending divergently outwardly and rearwardly, means for pivoting said wings connected thereto, rotors on said wings and synchronized drive means for driving said rotors connected thereto, said rotors being partially received in said chamber when said wings are in a folded position and being disposed at an attitude to provide lift at high speeds for said airplane in said folded position.

2. An airplane according to claim 1, including jet propulsion means at the rear of said fuselage.

3. An airplane according to claim 2, wherein said chamber communicates with said jet propulsion means to provide for at least a portion of air intake for said jet propulsion means.

4. An airplane according to claim 3, including wing roots disposed forwardly of said chamber and extending outwardly of said body in opposite sides thereof.

5. An airplane according to claim 4, wherein said fuselage is provided with a tail section, said tail section including rotor means for providing for rudder and elevator controls, said drive means being connected to said rotor means.

6. An airplane in accordance with claim 1, wherein said wings include upper and lower portions, said rotors being disposed between said upper and lower portions.

7. An airplane according to claim 6, wherein said fuselage is provided with a tail section, and jet propulsion means mounted in said tail section.

8. An airplane according to claim 7, including air duct means communicating said chamber with said tail section to provide for at least partial air intake to said jet propulsion means.

9. An airplane according to claim 8, wherein said tail section includes rotor means for providing elevator and rudder controls, said drive means being connected to said rotor means.

References Cited

UNITED STATES PATENTS

| | | | |
|---|---|---|---|
| 2,008,424 | 7/1935 | Stalker | 244—6 |
| 2,623,711 | 12/1952 | Pullin et al. | 244—17.23 X |
| 2,738,146 | 3/1956 | Medvedeff | 244—6 |

MILTON BUCHLER, *Primary Examiner.*

R. A. DORNON, *Assistant Examiner.*